United States Patent [19]
McDade et al.

[11] Patent Number: 6,127,965
[45] Date of Patent: Oct. 3, 2000

[54] METHOD AND APPARATUS FOR REJECTING RAIN CLUTTER IN A RADAR SYSTEM

[75] Inventors: James C. McDade, Poway; Robert E. Stone, San Diego; Eric P. Bohley, Escondido; Roger J. Schlichtig, Westlake Village, all of Calif.

[73] Assignee: Eaton-VORAD Technologies, L.L.C., San Diego, Calif.

[21] Appl. No.: 09/122,479

[22] Filed: Jul. 23, 1998

[51] Int. Cl.$^7$ .............................. G01S 13/93; G01S 13/50; G01S 13/00

[52] U.S. Cl. .............................. 342/159; 342/24; 342/27; 342/28; 342/61; 342/70; 342/104; 342/109; 342/112; 342/118; 342/128; 342/129; 342/175; 342/195; 342/196

[58] Field of Search .................................. 342/24, 27, 28, 342/29, 41, 61–65, 71–72, 104, 105, 109, 112, 115, 118, 119, 128–132, 159, 175, 192–197

[56] References Cited

U.S. PATENT DOCUMENTS

| | | | |
|---|---|---|---|
| 5,302,956 | 4/1994 | Asbury et al. | 342/70 |
| 5,325,096 | 6/1994 | Packett | 342/70 |
| 5,325,097 | 6/1994 | Zhang et al. | 342/71 |
| 5,339,075 | 8/1994 | Abst et al. | 342/70 X |
| 5,481,268 | 1/1996 | Higgins | 342/70 |
| 5,530,447 | 6/1996 | Henderson et al. | 342/70 |

OTHER PUBLICATIONS

Jerry D. Woll, "*Monopulse Radar for Intelligent Cruise Control*," Jan. 29–30, 1997, Ford Technology Review Program, Ford Motor Company.

*Primary Examiner*—Bernarr E. Gregory
*Attorney, Agent, or Firm*—Jaquez & Associates; Martin J. Jaquez, Esq.

[57] ABSTRACT

A method and apparatus for detecting the presence of objects in a vehicle operator's blind spots. The apparatus comprises a side-facing Doppler radar system using continuous wave (CW) transmission with frequency modulation (FM) operation from a frequency modulation switching technique. The radar system determines the presence, range and closing rate of detected targets. The radar system detects targets even when operated in adverse weather conditions and will not generate false warnings due to rain clutter caused by wet roads and other wet surroundings. The radar system uses ranging techniques to reject false targets that are detected outside of a predetermined target detection zone. In accordance with the present invention, the radar system indicates that a target is detected if and only if any part of the target is within the detection zone and it: (1) remains in front of the antenna for at least TH1 seconds; (2) is at a range between Range$_{min}$ and Range$_{max}$; and (3) is moving faster than Closing-Speed$_{min}$ relative to the antenna. By rejecting targets that are closer than Range$_{min}$ feet to the antenna, false alarms due to rain clutter are dramatically reduced. Also, by rejecting targets that are further than Range$_{max}$ feet from the antenna, the radar system reduces false alarms caused by wet foliage and other wet "non-road" surroundings. In one embodiment, the radar system uses a patch array antenna oriented into a diamond-shape configuration to effectively create a natural linear amplitude taper that aids in rejecting clutter caused by wet road surfaces.

40 Claims, 3 Drawing Sheets

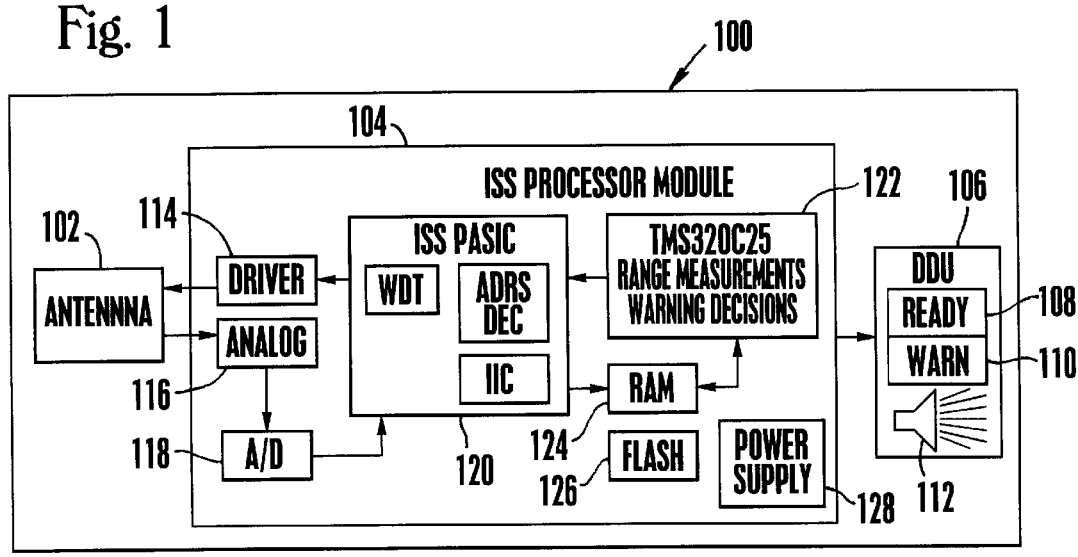
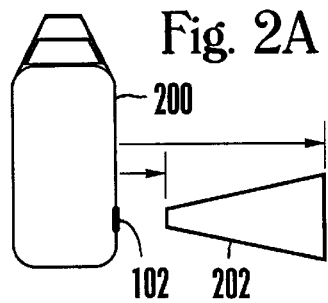
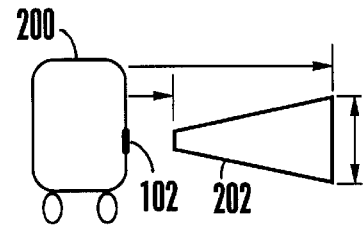
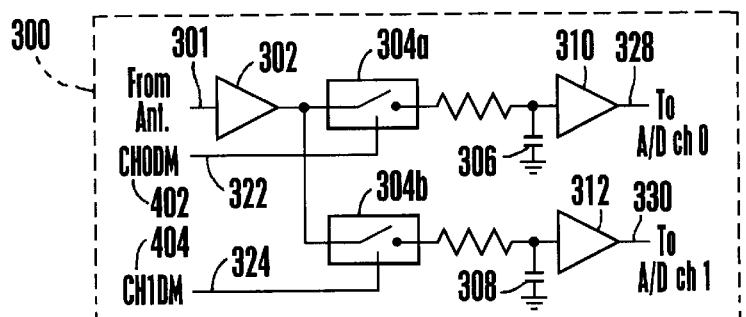
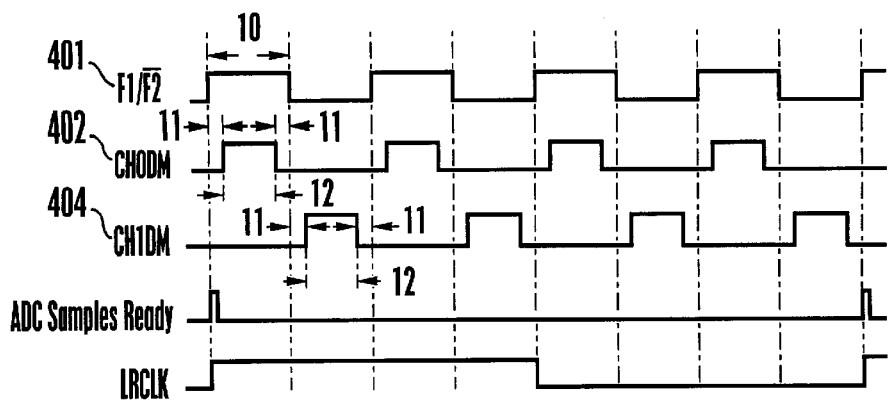

METHOD AND APPARATUS FOR REJECTING RAIN CLUTTER IN A RADAR SYSTEM

BACKGROUND OF THE INVENTION

1. Field of the Invention

This invention relates to radar systems, and more particularly to an apparatus and method for rejecting rain clutter in a radar system used to detect the presence of obstacles in regions that are difficult to see by a host vehicle operator.

2. Description of Related Art

A problem that continues to plague automotive vehicle operators is difficulty in observing obstacles or other vehicles proximate the operators' vehicle but in locations or regions that are difficult to observe from the operators' seat within the vehicle. Such locations or regions that are near a vehicle yet not directly observable from the driver's seat are commonly referred to as "blind spots." For example, the region between the angles of 90° and 170°, measured with respect to the forward direction of a vehicle in a clockwise direction (i.e., generally to the right of the vehicle and slightly behind the operator's seat), is typically a blind spot, particularly for large vehicles such as buses and trucks. Failure of an operator to be aware of an object (typically another vehicle) in this right-side blind spot when making a right-hand turn or a right lane change is a source of numerous accidents. Another common blind spot is the region directly to the rear of a vehicle. This region is of particular interest when the vehicle is in reverse gear (i.e., when "backing up"). Therefore, it is critical for the safe operation of a motor vehicle that the operator of the vehicle is able to detect obstacles (especially other vehicles) that are located in the operator's blind spots.

One prior art attempt at solving the problem of blind spot obstacle detection uses mirrors to aid the vehicle operator in detecting the presence of obstacles that might pose a hazard. Such mirrors have been made in a variety of shapes and having a variety of lenses. In addition such mirrors have been mounted in various locations to provide the operator with the greatest ability to detect the presence of obstacles in particular blind spots. For example, concave mirrors are commonly mounted to the right side of a vehicle and aimed at the right-side blind spot.

Mirrors provide the operator with some information regarding the presence of obstacles in certain of a vehicle's blind spots. However, disadvantageously, mirrors are less useful at night and under adverse weather conditions. Even under the best of conditions, mirrors that distort the reflection are typically required to allow the operator to view the right rear blind spot. Some operators find it difficult to properly interpret the image that is presented in such mirrors (such as convex mirrors that are commonly used as right side mirrors). Further, mirrors tend to reflect the headlights of vehicles approaching from behind and thus blind the driver of the vehicle on which the mirror is fixed. Hence, a more complete and satisfactory solution is desired.

One known alternative to the use of mirrors to detect obstacles in a vehicle's blind spot is to mount a camera on the vehicle to provide the operator with a visual image of obstacles in the vehicle's blind spot. However, this solution is complex and expensive, requiring a video camera and video monitor. Further, a video monitor can present a complex image, which, even if undistorted, can be difficult to interpret rapidly under stressful conditions that occur during heavy traffic conditions. Still further, monitors can be distracting. Moreover, like mirrors, such camera systems are less useful at night and under adverse weather conditions such as rain, sleet, or snow.

Another alternative to the use of mirrors is to direct radar transmissions toward each blind spot. Reflections of the radar transmissions can then be detected to determine the presence of obstacles in each of the blind spots. One such system is disclosed in U.S. Pat. No. 5,325,096, issued on Jun. 28, 1994 to Alan Packett and assigned to the owner of the present invention, which is hereby incorporated by reference. These systems use a common radar transceiver that transmits a radio frequency (RF) signal into a vehicle's blind spot. The transmitted signal is reflected by obstacles that are present in that blind spot region. The frequency of the transmitted signal is compared with the frequency of a reflection of the transmitted signal which is received within the radar system to determine whether the reflected signal has been Doppler shifted. A Doppler shift in the frequency generally indicates that an obstacle is present in the blind spot.

Disadvantageously, such Doppler radar blind spot sensors frequently generate false warnings (i.e., detect false targets) when used in adverse weather conditions, especially when used in the rain. There are two principle sources for the false alarms: (1) rain clutter produced by rain falling within a close range of the radar sensor; and (2) reflections from wet road surfaces, wet "non-road" surfaces, and wet foliage on the sides of the roads. Disadvantageously, the prior art vehicular radar systems misinterpret rain clutter, wet road surfaces and wet foliage as dangerous target objects. Consequently, the prior art radar systems falsely warn the driver of the existence of an object in the driver's blind spot. This creates a nuisance condition for the driver. The rain clutter, wet road conditions and wet foliage that the host vehicle (i.e., the vehicle equipped with the radar system) passes causes the radar system to falsely indicate the presence of an object in the host vehicle's blind spot even when no real threat exists. This can cause the operator of the host vehicle to lose faith in the reliability of the radar system and leave the system ineffective for warning the operator of real threats. In addition, such indications are distracting and disturbing to the operator.

Accordingly, a need exists for a simple, inexpensive solution to the problem of detecting hazardous obstacles in the blind spots of a vehicle. Such a solution should also be useful at night and under adverse weather conditions and should not generate nuisance conditions in response to rain clutter, wet road surfaces and wet foliage on the sides of the road as the host vehicle passes. The present invention provides such a solution.

SUMMARY OF THE INVENTION

The present invention is a novel method and apparatus for detecting targets in a host vehicle's blind spot and generating an indication to the driver of the host vehicle only when such targets are present. The radar system detects targets even when operated in adverse weather conditions and will not generate false warnings due to rain clutter caused by wet roads and other wet surroundings. The radar system uses ranging techniques to reject false targets caused by rain clutter detected outside of a predetermined target detection zone. The present invention is a Doppler radar system using continuous wave (CW) transmission with frequency modulation (FM) operation from a frequency modulation switching technique. The radar system independently and concurrently measures range and closing rate for a number of detected targets. In one preferred embodiment, the frequency modulation switching technique comprises frequency shift keying (FSK). A fixed-beam antenna transceiver transmits a radio frequency (RF) signal having a selected center frequency and at least two deviation frequencies (f1 and f2). In one preferred embodiment, the center frequency of the transmitted RF signal is 24.725 GHz and the deviation frequencies are spaced apart by approximately 1.25 MHz around the selected center frequency.

The transmitted RF signal is reflected off objects in the field of view of the antenna.

The two transmit frequencies, f1 and f2, when reflected from a target, generate two Doppler signals corresponding to the transmit frequencies. The reflected signals are downconverted into two baseband difference signals, channel 0 and channel 1 signals corresponding to the f1 and f2 transmit signals. The baseband signals contain the Doppler shift frequencies for objects in the antenna field of view. The radar system amplifies, filters, de-multiplexes, and digitizes the returned signals to produce a digital data stream. The digital data stream is conditioned and stored in circular buffers associated with the channel 0 and channel 1 difference signals. Each buffer is divided into four blocks of 256 words. Using this storage scheme, a 512 sample point block is created from two consecutively filled data blocks. A digital signal processor (DSP) performs a fast Fourier Transform (FFT) operation on the 512 sample point block to transform the signal data from the time domain to the frequency domain. The DSP uses the transformed data to calculate the presence, range and closing rate of targets within the antenna field of view.

Because the power level of the signals transmitted by the antenna is constant, power variations in the reflected signals are used by the DSP to detect the presence of targets. If there is more than a predetermined amount of power at the same Doppler frequency in both the channel 0 and channel 1 data a target is assumed to be present. The DSP determines the exact phase relationship between the channel 0 and channel 1 signals. The range of a target is determined by analyzing the phase difference between the two signals. Motion relative to the antenna is also calculated by the DSP. The DSP calculates motion relative to the antenna using the Doppler shift in the signal returned from the target. The DSP can identify and track a plurality of targets.

Once the range of a target is determined, the present invention rejects targets that are not within a predetermined detection zone for a selected duration. In accordance with the present invention, the radar system indicates that a target is detected if any part of the target is within the detection zone and it: (1) remains in front of the antenna for at least TH1 seconds; (2) is at a range between $Range_{min}$ and $Range_{max}$; and (3) is moving faster than $Closing\text{-}Speed_{min}$ relative to the antenna. In one preferred embodiment, the $Range_{min}$ and $Range_{max}$ values comprise two and twelve feet, respectively. By rejecting targets that are closer than two feet to the antenna false alarms due to rain clutter are dramatically reduced. Also, by rejecting targets that are further than twelve feet from the antenna the radar system reduces false alarms caused by wet foliage and other wet "non-road" surroundings. In addition, by rejecting targets that are further than twelve feet from the antenna the radar system will not alarm when targets are more than one lane away from the host vehicle and therefore do not pose collision threats to the host vehicle. Moreover, by orienting a square NXN patch array antenna into a diamond-shape configuration, a natural linear amplitude taper is effectively created that aids in rejecting clutter caused by wet road surfaces.

BRIEF DESCRIPTION OF THE DRAWINGS

FIG. 1 is a block diagram of a preferred embodiment of the side-facing Doppler radar system of the present invention.

FIG. 2 shows a typical target detection zone used by the side-facing radar system of the present invention. FIG. 2a shows a top plan view of a host vehicle having the radar system of FIG. 1 deployed therein. FIG. 2b shows a back elevation view of the host vehicle of FIG. 2a.

FIG. 3 shows a simplified block diagram of the sampling circuitry used in the antenna receiver of the present invention.

FIG. 4 is a timing diagram showing the switch timing control signals used to control the sampling circuitry of FIG. 3.

Like reference numbers and designations in the various drawings indicate like elements.

DETAILED DESCRIPTION OF THE INVENTION

Figure 5:
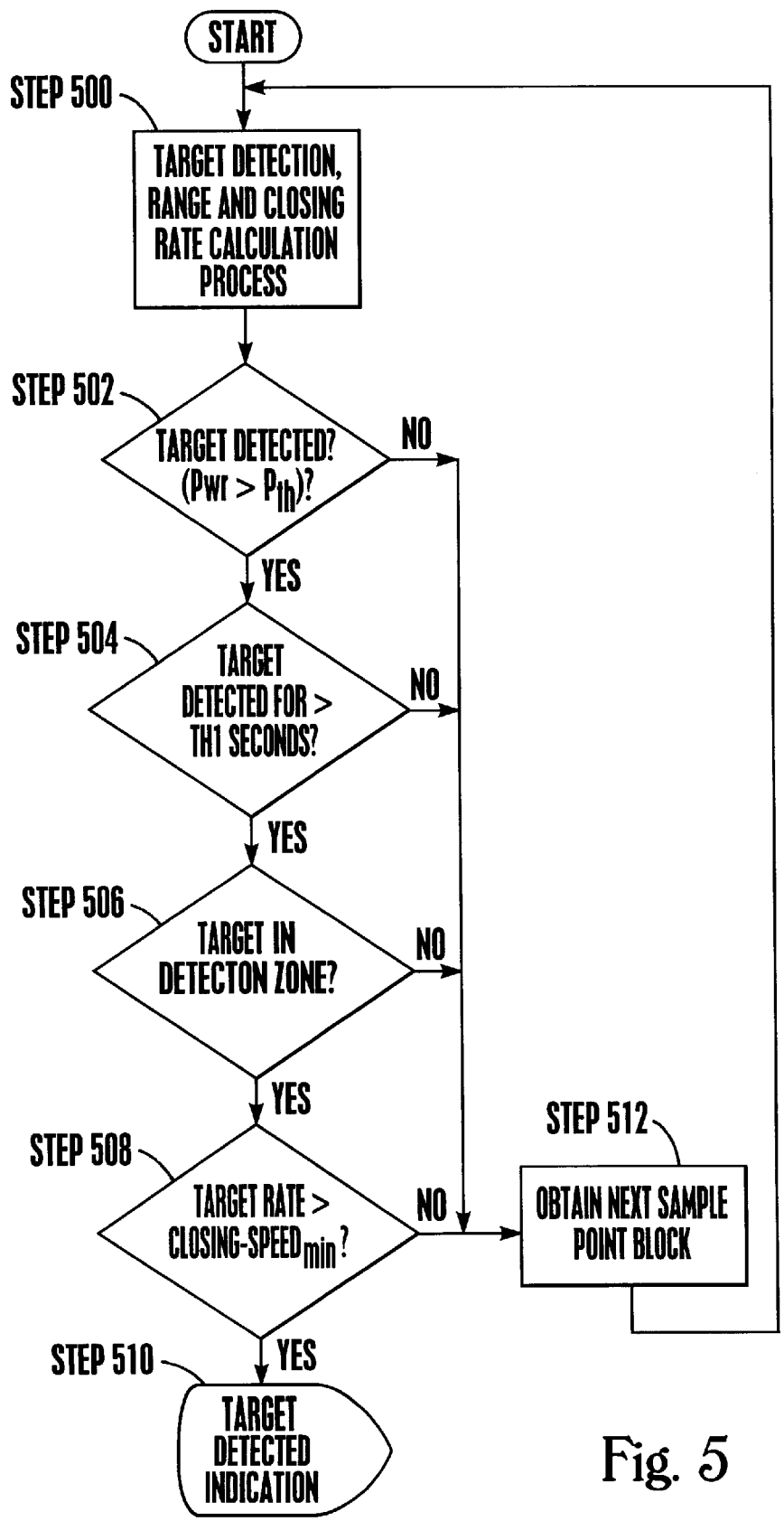
FIG. 5 is a high level flowchart of the method used to determine whether to indicate the presence of a target.

Throughout this description, the preferred embodiment and examples shown should be considered as exemplars, rather than as limitations on the present invention.

The preferred embodiment of the present invention is a method and apparatus for detecting objects in a host vehicle's blind spot and generating an indication to the driver of the host vehicle only when such an object is present. The present invention will not generate false warnings to the driver even when it is operated under rainy or otherwise adverse weather conditions.

Overview

In accordance with one embodiment of the present invention, objects are detected in a driver's blind spot using a side-facing Doppler radar system. A block diagram of a preferred embodiment of the side-facing Doppler radar system of the present invention is shown in FIG. 1. As shown in FIG. 1, the side-facing Doppler radar system 100 preferably comprises an antenna 102, a processor module ("PM") 104, and a display unit 106. In one embodiment, the antenna 102 and PM 104 are enclosed in the same mechanical housing which is preferably mounted to the side of a host vehicle (FIG. 2). In one embodiment, the side-facing radar system 100 is adapted for use and cooperates with a forward-facing radar system (not shown). The forward-facing radar system is used to do detect and warn the host vehicle's operator of potentially dangerous objects in the host vehicle's forward path of travel (i.e., objects dangerously close to and in front of the host vehicle). One such exemplary forward-facing radar system is described in U.S. Pat. No. 5,302,956, issued on Apr. 12, 1994 to Asbury, et al. and assigned to the owner of the present invention, which is hereby incorporated by reference.

The side-facing Doppler radar system 100 of the present invention warns the host vehicle's driver of potentially dangerous targets that are present alongside the host vehicle. The radar system 100 preferably measures ranges to detected targets. If the radar system 100 concludes that a target is within one lane of the host vehicle it transmits a "target present" signal to a forward-facing radar system.

Typically, the forward facing radar system will generate an appropriate warning by lighting an indicator or sounding an alert warning. In this embodiment, the PM 104 communicates to the display unit 106 via the forward facing radar system. Alternatively, the processor module may communicate directly to the operator via the display unit 106 (i.e., the side-facing radar system 100 operates independently from the forward facing radar system).

The display unit 106 may be mounted within the driver compartment (e.g., on the driver's cab when the host vehicle is a truck) or placed in any viewing location that is convenient to the driver. As shown in FIG. 1, the display unit 106 preferably includes at least two visual warning indicators 108, 110, and an audible warning indicator (such as a speaker) 112. The visual warning indicators 108, 110 are very high luminance light emitting diodes (LEDs) that are typically positioned on or in close proximity to a mirror on the same side of the host vehicle as the antenna 102. Consequently, when the host vehicle's operator looks in the mirror the warning indicators 108, 110 may be easily seen by the operator. Having the warning indicators 108, 110 affixed to an existing mirror allows them to be seen by a normal, practiced motion of the driver's head. However, the driver is not distracted or disturbed by the frequent indications of obstacles which may occur under normal traffic conditions, and which are of little or no interest to the driver unless a maneuver is attempted which would cause the vehicle to come into contact with the obstacle. As shown in FIG. 1, in addition to the warning indicators 108, 110, an obtrusive audible indicator 112 is provided which creates an audible tone, whistle, or buzz when an obstacle is present and the host vehicle's turn signal is active.

FIG. 2 shows a typical target detection area provided by the side-facing radar system 100 of the present invention. FIG. 2a shows a top plan view of a host vehicle 200 having the radar system 100 of FIG. 1 deployed therein. FIG. 2b shows a back elevation view of the host vehicle 200 of FIG. 1. The antenna 102 and PM 104 are preferably enclosed within the same mechanical housing and mounted to an appropriate side of the host vehicle 200. As shown in FIG. 2a, the antenna 102 and PM 104 are mounted to the right rear side of the host vehicle 200. In the example shown, the host vehicle's driver's seat is located on the front left side of the host vehicle 200. Thus, the antenna 102 is mounted in such a way as to detect targets in the host driver's blind spot. Typically, the target is a motorized vehicle including motorcycles, passenger automobiles, and trucks. Stationary objects, such as guardrails, tunnel walls within a predetermined distance of the antenna 102, and other extended objects are also considered to be valid targets and will be detected by the radar system 100. Once detection is made, a "target present" signal is generated by the radar system 100 and output to the front-facing radar system or display 106. In one embodiment, the target present signal remains active while the target is being detected, and then for an additional 1.5 seconds after the detection ends.

FIG. 2 shows the typical coverage area provided by the present side-looking radar system 100. In general, the radar system detects a target if any part of the target is within a "detection zone" 202 (the shaded area), and it: (1) remains in front of the antenna 102 for at least TH1 seconds; (2) is at a range between $Range_{min}$ and $Range_{max}$;

and (3) is moving faster than $Closing\text{-}Speed_{min}$ relative to the antenna 102 (radially).

In one preferred embodiment, TH1 is approximately 0.30 seconds, $Range_{min}$ is approximately two feet, $Range_{max}$ is approximately twelve feet, and $Closing\text{-}Speed_{min}$ is approximately 0.07 miles per hour. Therefore, in the preferred embodiment, the radar system 100 shall detect a target if any part of the target is within the detection zone 202 and it remains in front of the antenna 102 for at least 0.30 seconds, is at a range between two and twelve feet, and is it is moving faster than 0.07 mph relative to the antenna 102. The $Range_{min}$ and $Range_{max}$ cutoffs are implemented in software that is executed by the PM 104 (FIG. 1). The detection zone 202 shown in FIGS. 2a and 2b is target dependent. Targets that have very low reflective energies (i.e., targets that reflect very little energy back to the antenna 102) have reduced detection zones 202. In contrast, targets that have high reflective energies have increased detection zones 202.

Side-facing Doppler Radar System—Detailed Description

Referring again to FIG. 1, the PM 104 performs many of the important functions of the side-facing radar system 100 of the present invention. For example, the PM 104 generates timing signals to the antenna 102, receives returned analog signals from the antenna 102, conditions the analog signals, and performs an analog-to-digital ("A/D") conversion converting the analog signals into the digital domain. The PM 104 processes the digital antenna data using a PM application specific integrated circuit (ASIC) 120 and a digital signal processor 122 ("DSP"). The PM 104 communicates with the display unit 106 (or, alternatively, with a forward-facing radar system) to indicate alarm and built-in-test ("BIT") failure conditions. The PM 104 also includes nonvolatile random access memory ("RAM") and flash RAM circuitry.

As shown in FIG. 1, the PM 104 preferably comprises an antenna driver 114, an antenna receiver 116, an A/D converter 118, the PM ASIC 120, the DSP 122, a RAM 124, a flash RAM 126, and a power supply 128. In one preferred embodiment, the DSP 122 comprises a TMS320C203 digital signal processor integrated circuit manufactured by Texas Instruments. The power supply 128 is designed to operate between 6.0V and 32.0V. The antenna driver 114, antenna 102, and antenna receiver 116 cooperate and function together as a millimeter wave transceiver. The transceiver radiates and receives radio frequency (RF) signals that are reflected off objects in the antenna 102 field of view. The reflected signals return to the antenna 102 where the antenna receiver 116 "down-converts" the signal to baseband signals. The baseband signals contain the "Doppler" shift frequencies for objects in the antenna 102 field of view. As is well known in the radar art, the frequency of a reflected received signal may be shifted from the frequency of the transmitted signal upon its return due to the "Doppler" effect. Doppler effect occurs whenever a transmitted signal reflects off a target that has motion relative to a transceiver. The resulting frequency shift is referred to as a "Doppler shift". In accordance with the present invention, the baseband signals generated by the antenna receiver 116 include the Doppler shift frequencies for objects in the antenna field of view.

The antenna receiver 116 includes analog circuitry that amplifies, filters, and de-multiplexes the baseband signals. The de-multiplexed signals are output to the inputs of the A/D converter 118. In the preferred embodiment the A/D converter 118 comprises an 18-bit stereo analog-to-digital converter. The digital data generated by the A/D converter 118 is conditioned and processed by the PM ASIC 120 and the DSP 122 to determine the presence of and range to a target. Because the power level of the signal transmitted by the antenna 102 is constant, power variations in the signals applied to the A/D converter 118 are attributable to power variations in the received signal. The DSP 122 uses this fact to detect the presence of targets within the antenna 102 field of view. If the power level of the signal output by the A/D converter 118 exceeds a predetermined threshold ($P_{th}$) the DSP 122 concludes that a target is present. Further, if the range indicates that the target is within one lane of the host vehicle (i.e., if the range falls between predetermined $Range_{min}$ and $Range_{max}$ values), a "target present" signal is generated on an output transmission line 130.

Advantageously, the side-facing Doppler radar system 100 of the present invention accurately detects targets that are within one lane of the host vehicle even when it is operated in adverse weather conditions. Rather than merely detecting the movement of targets or objects in the antenna field of view (as do the prior art blind spot sensors), the present invention uses ranging information to distinguish between rain clutter and valid targets. In accordance with the present method and apparatus, the side-facing Doppler radar system 100 rejects all targets that are within $Range_{min}$ of the antenna 102. In one embodiment, $Range_{min}$ is approximately two feet. The inventors have observed that the majority of false alarms caused by rain clutter are due to rain clutter occurring within two feet of the antenna. Therefore, by rejecting all targets detected within two feet of the antenna 102, the present side-facing radar system 100 advantageously eliminates the false alarms due to rain clutter. Consequently, the present side facing radar system 100 performs much better in rain conditions than the prior art blind spot sensors.

The transceiver section of the present side-facing Doppler radar system 100 (namely the antenna 102, the antenna driver 114, and the antenna receiver 116) process signals similarly to the transceiver section of the prior art forward-facing ranging Doppler radar system described in U.S. Pat. No. 5,302,956. For example, in one preferred embodiment, the transceiver section includes an oscillator, such as a gallium arsenide (GaAs) GUNN diode oscillator, that produces a transmit signal. The GUNN diode oscillator is coupled to a Schottky diode mixer receiver and associated circuitry on a microwave integrated circuit (MIC).

The frequency of the transmit signal varies as a function of a frequency control voltage signal 406 (described in more detail below with reference to FIG. 4) that is coupled to the oscillator from the PM ASIC 120. The voltage level is controlled by the PM ASIC 120. The voltage level applied to the oscillator alternates between two voltage levels (F1/F2), thereby causing the transmit frequency to alternate between two deviation frequencies (f1 and f2). In the preferred embodiment, the center frequency of the signal transmitted by the antenna 102 is approximately 24.725 GHz. The two deviation frequencies (referred to hereafter as the channel 0 transmit frequency f1, and the channel 1 transmit frequency f2) are preferably spaced apart by about 2.5 MHz and are time-multiplexed into a single output. The channel 0 transmit frequency f1 is 24.725 GHz minus 1.25 MHz, or 24.72375 GHz. The channel 1 transmit frequency f2 is 24.725 GHz plus 1.25 MHz, or 24.72625 GHz. As described below in more detail, the transmit frequencies f1 and f2 are transmitted at a time-shared switched rate of approximately 10 kHz.

In one preferred embodiment, the antenna driver 114 comprises a voltage regulator.

The voltage regulator supplies the F1/F2 modulated voltage levels to the oscillator. In one embodiment, both the F1 and F2 voltage levels are varied via software that is executed within the PM 104. Consequently, the transmit signal frequencies can be deviated without the need for manual adjustment.

In the preferred embodiment of the present invention, the antenna 102 both transmits the transmit signals and receives signals that are reflected off of objects in the antenna 102 field of view. The Schottky diode mixer (not shown) is coupled to the transmitted signal and the received signal. The received RF signal is thereby compared to the transmitted signal. The output of the mixer is a "difference" or "down-converted" signal that has a frequency equal to the difference between the frequency of the transmitted signal and the received signal. Signal switches time de-multiplex and sample the down-converted difference signals as described below with reference to FIG. 3.

A simplified block diagram of the sampling circuitry 300 in the antenna receiver 116 is shown in FIG. 3. The sampling circuitry 300 controls the de-multiplexing of the difference signals received by the antenna 102 and generated by the mixer. As shown in FIG. 3, the sampling circuitry includes a pre-amplifier ("pre-amp") 302, two analog signal switches 304a, 304b, two low pass filter capacitors 306, 308, and two output amplifiers 310, 312. The difference signals are input to the sampling circuitry 300 on input line 301 and provided as inputs to the pre-amp 302. The output of the pre-amp 302 is provided to the signal switches 304a and 304b. In one preferred embodiment, the signal switches 304a, 304b comprise MC14053BD analog switches available from Motorola, Inc. The signal switches 304a, 304b are used to time de-multiplex the difference signals generated by the mixer in the antenna receiver 116.

The pre-amp 302 amplifies the difference signals coupled from the mixer. The signal that is presented to the pre-amp 302 is a composite of the various signals that are received and mixed with the transmit signal. Typically, when the transmit signal is transmitted a plurality of targets reflect some of the signal back to the antenna 102. Some of those targets may be stationary with respect to the antenna 102, while others may have a relative motion with respect to the antenna 102. By virtue of the Doppler shift that occurs when a radio wave is reflected off a target in motion relative to the transmitter or receiver, the frequency difference between the transmit signal and the receive signal can be used to determine the relative speed of the target and to distinguish one target from another, assuming there is a difference in the relative speed of the targets.

As shown in FIG. 3, the output of the pre-amp 302 is coupled to both of the signal switches 304a, 304b. The signal switches 304a and 304b time de-multiplex the signal from the pre-amp 302 by coupling the pre-amp 302 to either the channel 0 audio amplifier 310 and low pass filter capacitor 306, or the channel 1 audio amplifier 312 and low pass filter capacitor 308, alternatively.

Paired switch timing control signals CH0DM 402, and CH1DM 404, coupled to respective paired signal switches 304a, 304b from the PM ASIC 120 on switch timing control lines 322, 324, respectively, determine to which low pass filter capacitor 306, 308 the pre-amp 302 output is to be coupled, and the timing of such coupling. FIG. 4 is a timing diagram showing the timing of the switch timing control signals CH0DM 402, CH1DM 404 with respect to the frequency control voltage signal 406 that is coupled to the oscillator on the frequency control voltage signal line from the PM ASIC 120. In the preferred embodiment of the present invention, the frequency control voltage signal 406 alternates between a relatively high voltage and a relatively low voltage at intervals of 51.2 µs. One period of the frequency control voltage signal 406 is equal to 102.4 µs, or has a frequency of approximately 9.7656 kHz. Therefore, the output frequency of the transmit oscillator alternates between a relatively low frequency (f1, the channel 0 transmit frequency) and a relatively high frequency (f2, the channel 1 transmit frequency) at intervals of 51.2 μs as a function of the frequency control voltage F1/F2 406.

Referring now to FIGS. 3 and 4 simultaneously, the channel 0 select signal CH0DM 402 in a high state causes the pre-amp 302 output to be coupled to the channel 0 low pass filter capacitor 306 through the signal switch 304*a*. The channel 1 select signal CH1DM 404 in a high state causes the pre-amp 302 output to be coupled to the channel 1 low pass filter capacitor 308 through the signal switch 304*b*. Because the PM ASIC 120 controls both the frequency control voltage signal (F1/F2) 406 and the channel select signals (CH0DM 402 and CH1DM 404), the signal switches 304*a*, 304*b* are time-synchronized to the frequency control voltage signal F1/F2. Therefore, the signal switch 304*a* connects the pre-amp 302 to the channel 0 low pass filter capacitor 306 for slightly longer than one-third of a period (38.4 μs), synchronized to the time when the transmit signal is at the channel 0 frequency f1 (because the frequency control voltage signal 406 is high during this time). Similarly, the signal switch 304*b* connects the pre-amp 302 to the channel 1 low pass filter capacitor 308 for slightly longer than one-third of a period, synchronized to the time when the transmit signal is at the channel 1 frequency F2 (because the frequency control voltage signal 406 is low during this time). Hence, the signal switches 304*a*, 304*b* time demultiplex the down-converted channel 0 and channel 1 difference signals. Alternative embodiments, in which the length of the channel 0 and channel 1 select signal 402, 404 pulses are longer or shorter, are within the scope of the present invention.

The timing diagram of FIG. 4 shows the channel 0 select signal 402 pulses and the channel 1 select signal 404 pulses offset from the respective edges of the frequency control signal 406 to allow the transmit signal time to stabilize and to ensure that the receive and the transmit signals are at the same carrier frequency (i.e., both the receive and transmit signals are at either the channel 0 or channel 1 frequency) when the channel 0 and channel 1 select signals 402, 404 are active. However, it should be understood that in alternative embodiments of the present invention, these signals 402, 404 may occur anywhere at or between the rising edge and the falling edge of the frequency control voltage signal 406.

The low pass filters 306, 308 hold the output of the signal switches 304*a*, 304*b* by acting as envelope detectors. The channel 0 low pass filter 306 holds (or "smoothes") the time de-multiplexed down-converted channel 0 difference signal and the channel 1 low pass filter 308 holds the time de-multiplexed down-converted channel 1 difference signal. The output of each filter 306, 308 is a smooth signal having frequency components equal to the difference between the frequency of the transmit signal corresponding to the channel associated with the filter and the frequency of each signal received during the time that channel is transmitted. For example, the channel 0 low pass filter 306 outputs a smooth signal having a frequency equal to the difference between the channel 0 transmit frequency and the channel 0 receive frequencies reflected from a number of targets as if the channel 0 transmit frequency were transmitted in a continuous wave fashion.

The outputs of the sampling circuit 300 are coupled to the stereo A/D converter 118 (FIG. 1). The A/D converter 118 includes two discrete channels corresponding to the channel 0 and channel 1 signals output by the sampling circuit 300 on output signal lines 328 and 330, respectively. Each channel of the A/D converter 118 converts the analog inputs from the corresponding down-converted frequency channel into a stream of digital data words. In the preferred embodiment, the A/D converter 118 comprises a sigma-delta A/D converter, part number CS5330A available from Crystal Logic, Inc. The A/D converter 118 preferably outputs a series of 18-bit data words. The first 16 bits represent the amplitude of the analog signal over a particular period of time (i.e., 16-bit resolution).

Thus, the signals reflected off of potential targets and received by the antenna 102 are sampled, time-multiplexed, and digitized into a digital data stream. The digital data stream represents the received signal as a time-multiplexed function of the transmitted signal. The digital data is coupled to the PM ASIC 120. The PM ASIC 120 provides timing information, collects the digital data stream generated by the A/D converter 118, and conditions the data so that it can be processed by the DSP 122. More specifically, the PM ASIC 120 reads data from the A/D converter 118 and writes the data to a memory block in the RAM 124 that is associated with the appropriate channel (i.e., channel 0 data is written into a memory block associated with the channel 0 difference signals, and channel 1 data is written into a memory block associated with the channel 1 difference signals). In the preferred embodiment, each data sample written into the RAM 124 is 16-bits wide (truncated by hardware from the 18-bit A/D converter 118). The channel 0 data and channel 1 data (associated with the f1 and f2 transmit frequencies, respectively) are preferably stored separately within the RAM 124 in two circular buffers, each buffer capable of storing 1,024 words of data. Each buffer is divided into four blocks of 256 words. Using this storage scheme, a 512-sample point block is created from two consecutively filled data blocks (comprising 256 sample points from channel 0 and 256 sample points from channel 1).

The DSP 122 is coupled to the PM ASIC 120, the RAM 124, and the flash RAM 126. The DSP 122 calculates the range to detected targets using the data stored in the RAM 124. The DSP 122 performs this calculation using techniques similar to those described in U.S. Pat. No. 5,302,956. Because the power level of the signal transmitted by the antenna 102 is constant, power variations in the signal generated by the A/D converter 118 are attributable to power variations in the received signal. If there is more than a predetermined amount of power at the same Doppler frequency in both the channel 0 and channel 1 signals, a target is assumed to be present. The DSP 122 also determines the exact phase relationship between the channel 0 and channel 1 signals. The DSP 122 determines the range of a target based upon the difference in phase between the two signals. Motion relative to the antenna 102 is also calculated by the DSP 122. The DSP 122 calculates motion relative to the antenna 102 using the Doppler shift in the signal returned from a target. In one embodiment, the DSP 122 can identify and track a plurality of targets. Targets are distinguished by their frequency (i.e., the amount of Doppler shift).

Before performing a windowing and a Fast Fourier Transform (FFT) operation on the 512 sample points stored in the RAM 124, the sample points preferably are scaled to the largest amplitude point/bin to maximize the fixed-point accuracy of the FFT operation. A 512 point "Blackman" window function is then applied to the scaled data buffer. When sufficient data is present in the RAM 124, the DSP 122 performs a 512-point complex FFT operation that maps the digital representation of the time-de-multiplexed receive signal from a time domain into a frequency domain. In this manner, the DSP 122 performs a spectral analysis of the data stored in the RAM 124 and determines the frequencies, phase relationships, and relative power at each frequency. Performing FFT operations using digital signal processors, such as the TMS320C203 DSP used in the preferred embodiment of the present invention is well known in the art. Therefore, the result of the FFT operation is a list of frequencies and the power level associated with each such frequency. When the power at a particular frequency is greater than a selected threshold amount $P_{th}$ the DSP 122 determines that a target is present.

After the frequency spectrum data is generated only the positive side of the spectrum needs to be considered. Noise floor estimates are computed for eight bands of varying widths, covering the majority of the data points of the positive frequency spectrum. The DSP 122 scans the frequency spectrum (within given limits of the noise bands) searching for a single highest frequency peak. If this peak exceeds a computed "detection threshold" for a given noise band the peak is considered to be a potential target. In one embodiment of the present invention, the DSP 122 detects the presence of only one target (i.e., there is no requirement to scan for more than one peak). However, in an alternative embodiment, more than one peak is detected. By counting the number of frequency peaks at which power is detected to be over the selected threshold $P_{th}$, the DSP 122 determines how many targets are present (i.e., how many targets are moving at different speeds relative to the antenna 102). Targets that move at the same relative speed reflect signals having the same frequency.

The DSP 122 also determines the phase relationship of the channel 0 signal data to the channel 1 signal data. From this information, the DSP can calculate the range and relative speed of a target. The determination of the range and relative speed is directly calculated by multiplying the frequency and phase difference by fixed factors, since the phase is linearly proportional to range of the target according to the formula, $R = C*(\theta_1 - \theta_2)/(4\pi(f1-f2))$, and frequency is linearly proportional to the relative speed of the target according to the formula, $f_d = 72$ (Hz.hours/mile)*V (miles/hour). In the range formula, R is the range to the target in feet, C is the speed of light in feet/second, f1 is the frequency of the transmitted channel 0 signal, and f2 is the frequency of the transmitted channel 1 signal. In the relative speed formula, $f_d$ is the frequency shift due to the Doppler phenomenon, and V is the relative velocity of the target with respect to the transceiver. However, in alternative embodiments, other means to map the frequency to a relative speed and the phase relationship to range may be used. For example, a table may be used to cross-reference frequency and phase to relative speed and distance, respectively.

If the data is not within selected preset limits it is deemed to be invalid and is disregarded. If the data is within the preset limits, the DSP 122 uses a tracker software module to create a filtered time track or record of the target's range and relative speed information. The DSP 122 compares the new target range and relative speed with ranges and relative speeds previously recorded. If the range and relative speed of a target is consistent with the range and relative speed of a previously recorded target (i.e., if the difference between the range and speed of a new target and the range and speed of a previously recorded target is within a predetermined amount), the DSP 122 updates the range and relative speed previously recorded with the newly received range and relative speed. If the new target does not correspond to an existing target, the range and relative speed are stored and a new target is thus defined. When the DSP 122 fails to receive data that closely matches a previously recorded target, the previously recorded target is assumed to have left the environment and the range and relative speed are dropped from the record. Thus, in one alternative embodiment, the system can identify and track a multiplicity of targets concurrently.

The DSP 122 generates warnings at the end of every processing cycle. The warning signals generated by the present radar system include the following: "no target" (no tracked target); "target within the detection zone" 202 (FIG. 2); "system malfunction" (hardware failure detected during power-up or online test procedures); and "inoperable conditions exist" (e.g., heavy rain which raises the noise floor above a certain threshold, ice or mud pack covering the antenna 102, signal-to-noise level is too low, or no peak detected for a time period exceeding a predetermined threshold). The warning signals generated by the DSP 122 are provided over the output transmission line 130.

FIG. 5 is a high level flowchart of the method by which the DSP 122 determines whether to indicate the presence of a target. Initially, the DSP 122 enters STEP 500 after performing a 512-point FFT operation on the data stored in the RAM 124 (256 sample points of channel 0 data and 256 sample points of channel 1 data). In accordance with the preferred embodiment, a new FFT is computed for every 256 new sample points thus producing a 50% overlapping FFT on new and previously computed sample points. The method proceeds to STEP 502 to determine whether there is a potential target before the antenna 102 (FIG. 1). As described above, because the power of the transmitted signal is constant, power variations in the reflected signal are used to detect the presence of a target. At STEP 502, the method determines whether the power level of the signal output by the A/D converter 118 ("Pwr") exceeds a predetermined threshold ($P_{th}$). If it does, the method proceeds to STEP 504 to determine how long the target has been before the antenna 102. If not, the method proceeds to step 512 to obtain the next 256 sample points for a subsequent FFT operation.

At STEP 504, the DSP 122 determines whether the target has been before the antenna 102 for a predetermined period of time. As described above, in order for the DSP 122 to conclude that a target is present, the target must remain in front of the antenna 102 for at least a period of TH1 seconds. In the preferred embodiment, TH1 is approximately 0.30 seconds. In alternative embodiments, TH1 can assume different values depending upon the sensitivity characteristics required by system parameters. As shown in FIG. 5, if the target remains in front of the antenna 102 for at least a time period of TH1 seconds, the method proceeds to STEP 506 to determine whether the target is within the detection zone. Else, the method proceeds to STEP 512.

As described above with reference to FIG. 2, the present side-facing Doppler radar system 100 reports on targets if and only if they remain within a predetermined detection zone for a predetermined time period. In accordance with the present method and apparatus, the side-facing Doppler radar system 100 rejects all targets that are within $Range_{min}$ of the antenna 102. In one embodiment, $Range_{min}$ is approximately two feet. Because the majority of false alarms in rainy conditions are caused by rain clutter that is within two feet of the antenna, the method rejects any targets that are within two feet of the antenna in STEP 506. By rejecting all targets detected within a specified range $Range_{min}$ of the antenna 102, the detection method of the present invention vastly reduces the false alarms caused by rain clutter. In addition, by rejecting targets that are beyond a specified range $Range_{max}$ of the antenna 102, the detection method reduces false alarms due to clutter caused by wet foliage and other wet conditions surrounding the antenna 102. As shown in FIG.

5, if the target is not within the detection zone, the method proceeds to STEP 512 and obtains the next sample point block. However, if the target is at a range that is between Range$_{min}$ and Range$_{max}$ (i.e., within the detection zone), then the method proceeds to STEP 508.

At step 508 the present target detection method determines whether the target's closing rate exceeds a specified value. As described above, targets are not indicated by the present invention unless they move at a velocity that exceeds a minimum closing speed threshold (Closing-Speed$_{min}$) relative to the antenna 102. In the preferred embodiment, targets are not indicated unless they are moving at least 0.07 mph relative to the antenna 102. In alternative embodiments, this velocity resolution can be varied as necessary to meet system requirements. If the target's velocity is less than Closing-Speed$_{min}$, the method proceeds to STEP 512 to obtain the next sample point block. However, if the target is moving at a rate that exceeds Closing-Speed$_{min}$, the method generates a warning that the target is within the detection zone at STEP 510.

The target detection method shown in FIG. 5 preferably comprises software executed by the DSP 122 in the PM 104. The method and apparatus of the present invention can alternatively be implemented using any convenient or desirable sequencing devices such as state machines, present state-next state discrete logic, or field programmable gate array devices. The target detection method shown in FIG. 5 can be implemented in hardware (i.e., "hardwired") or alternatively can be implemented using other types of programmable devices.

Effects of Antenna Shape and Antenna Beamwidth on Reducing False Alarms due to Rain Clutter The inventors have observed via experimentation that a dominant contributor to rain-induced false alarm warnings is wet foliage and other wet "non-road" conditions surrounding the antenna 102. The wet conditions cause normally benign clutter to "light up" and blind the prior art radar systems. The ranging method and apparatus described above with reference to FIGS. 1–5 rejects the majority of clutter created when the system 100 is used in rainy conditions. However, the inventors have observed that further rain clutter rejection improvements can be achieved by narrowing the antenna beamwidth and by optimally shaping the antenna. Narrowing the antenna beamwidth reduces the reflections generated by wet road surfaces and wet non-road surfaces. The antenna beamwidth should be made as small as feasible in light of the antenna size and detection area coverage requirements. For example, in the preferred embodiment, the antenna beamwidth is +/−7.5 degrees in both azimuth and elevation.

Figure 6:
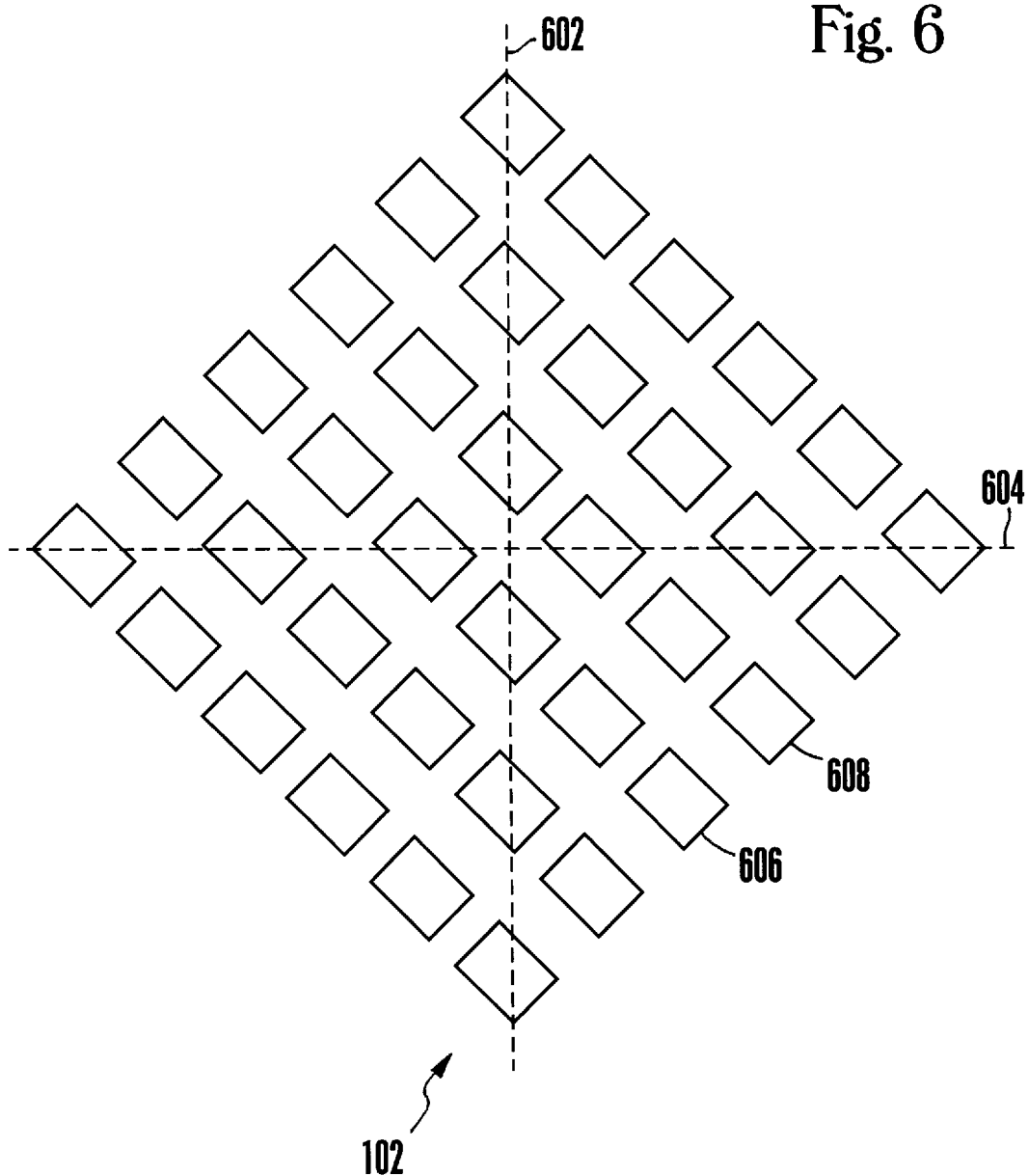
FIG. 6 shows one embodiment of the radar antenna shown in FIG. 1 having antenna patch elements arranged in a diamond shape to reduce the effects of rain clutter caused by wet road surfaces.

An effective means for producing a narrow beamwidth antenna and for lowering the "side lobes" of the signal radiated by the antenna is to use a square patch antenna array mounted diagonally with respect to the road surface (i.e., use a "diamond-shaped" antenna array). FIG. 6 shows one embodiment of the antenna 102 having antenna patch elements (e.g., elements 606 and 608) arranged in a diamond shape to reduce the effects of rain clutter. The antenna 102 shown in FIG. 6 comprises a 6×6 rectangular element array tilted on a diagonal axis 602. The antenna 102 is mounted to the host vehicle such that the other diagonal axis 604 of the square array is parallel with the road surface. Note that the diagonal axis 602 is both a "diagonal" axis of the square array and the "vertical" axis of the antenna 102 after it is mounted to the host vehicle. Similarly, the diagonal axis 604 is both a diagonal axis of the square array and the "horizontal" axis of the antenna 102 after it is mounted to the host vehicle. Thus, the cardinal planes of the antenna are oriented at 45 degrees to the vertical and horizontal axes.

This diagonal orientation of the antenna 102 does not adversely affect the target detection capability of the radar system 100. However, the diagonal orientation does aid in reducing false alarms due to wet road and non-road surroundings. The diagonal orientation effectively creates a natural linear amplitude taper in the vertical plane because the number of patch elements (e.g., elements 606 and 608) linearly decreases in the horizontal rows as one travels along the vertical axis 602 away from the center of the antenna array. In the example shown in FIG. 6, because the number of patch elements along the horizontal axis 604 decreases from six (at the center of the array) to one (at the bottom of the array) along the vertical axis 602, the side lobes of the signals radiated by the antenna 102 are correspondingly lowered. In one example, the first side lobes are lowered by approximately 13 dB as compared to the first side lobes of a square antenna (i.e., an antenna that is not tilted at a 45 degree angle with respect to the road surface) radiation pattern. All other side lobes are decreased to even lower levels. Decreasing the side lobes aids the present radar system 100 in ignoring the energy reflected back to the antenna from wet roads and other wet surroundings.

In addition to reducing the side lobes in the radiated signals, the diagonal orientation also creates a cross-polarized return signal. By tilting the antenna 102 into the orientation shown in FIG. 6, the return electric field vector reflected by a wet road surface is orthogonal to the electric field vector transmitted by the antenna 102. The orthogonality of the return vector is tremendously effective in rejecting rain clutter due to wet road conditions.

Several alternative antenna configurations are possible. For example, the antenna elements need not be oriented such that they create a diagonal polarization effect. The patch elements can be oriented in any desirable manner with respect to the vertical axis 602. The outline of the entire array determines the lowering effect on the side lobes (i.e., the outline of the patch elements creates a natural amplitude taper when configured as shown in FIG. 6, however, the orientation of the patch elements themselves has no effect). In an alternative embodiment, the antenna array comprises 16 rows by 16 columns of patch elements, arranged in a diamond shaped configuration to reduce rain clutter. Several variations on this configuration are within the scope of the present invention.

In summary, the method and apparatus includes a means for accurately and reliably detecting objects in the blind spots of a host vehicle operator. The present method and apparatus preferably uses a Doppler radar system mounted to the side of a host vehicle. In accordance with the present invention, an antenna transceiver transmits RF signals and receives signals reflected from potential targets. Using digital signal processing techniques, the radar system determines the presence, range and closing rates of potential targets. The present method determines whether the detected targets are within a predetermined detection zone for a selected period of time. Only those targets that are within the detection zone are reported to the operator. Advantageously, the present method rejects all targets within a certain range of the antenna thereby reducing false alarms due to rain clutter. The present invention uses range information to reject targets that are further than one travel lane from the antenna thereby reducing false alarms caused by wet foliage. Orienting the antenna into a diamond shape configuration further reduces clutter caused by wet road conditions.

A number of embodiments of the present invention have been described. Nevertheless, it will be understood that various modifications may be made without departing from the spirit and scope of the invention. For example, the relationship between the channel 0 transmit signal and the channel 1 transmit signal may be such that they differ in frequency by more or less than 2.5 MHz. Furthermore, the period of the frequency control voltage 406 (FIG. 4) may be greater or less than 102.4 µs, and may have a duty cycle of greater or less than 50 percent. As another example, the frequency modulation scheme can be something other than FSK. Also, the invention is not limited to using a 512-sample point FFT operation. Virtually any size FFT may be used to practice the present invention. In addition, the center frequency of the transmitted signal can be greater or less than 24.725 GHz. For example, in one embodiment presently contemplated the center frequency of the transmitted signal is approximately 76.5 GHz. Moreover, as described above with reference to FIG. 6, several alternative patch array antennas can be used with the present invention.

Accordingly, it is to be understood that the invention is not to be limited by the specific illustrated embodiment, but only by the scope of the appended claims.

What is claimed is:

1. A side-looking radar system for detecting presence of an object in the blind spot of a host vehicle upon which the radar system is mounted, wherein the object has an associated range and closing rate, comprising:

(a) a radar transceiver for transmitting radar signals and for detecting reflected signals of the transmitted radar signals that are reflected off an object;

(b) a processor block, coupled to the transceiver, for controlling timing of the signals transmitted by the transceiver, and for processing the reflected signals received by the transceiver, wherein the processor block determines a presence, range and closing rate of the object from which the reflected signals are reflected, and wherein the processor block determines whether the object is within a predetermined detection zone, wherein the predetermined detection zone has a first bounded range that is greater than a minimum range of the radar system and a second bounded range that is less than a maximum range of the radar system, and wherein the processor block also determines whether the object remains within the detection zone for a predetermined minimum period of time; and (c) an indicator, coupled to the processor block, the indicator receiving from the processor block an indication that the object remains within the detection zone for the predetermined minimum period of time, wherein the indicator warns an operator of the host vehicle that the object is present within the detection zone.

2. The side-looking radar system of claim 1, wherein the radar transceiver includes:

(a) an antenna;

(b) an antenna driver, coupled to the antenna for controlling transmissions from the antenna; and (c) an antenna receiver, coupled to the antenna, for processing the reflected signals, wherein the antenna receiver down-converts the reflected signals into baseband signals for further processing by the processor block.

3. The side-looking radar system of claim 2, wherein the antenna driver comprises a voltage regulator.

4. The side-looking radar system of claim 2, wherein the antenna driver supplies a modulated frequency control voltage signal to the antenna thereby modulating the transmitted radar signals such that they are transmitted at two or more frequencies.

5. The side-looking radar system of claim 4, wherein the transmitted radar signals are radio frequency (RF) signals transmitted at two transmit frequencies, f1 and f2, and wherein f1 and f2 are centered around a center frequency, $f_c$.

6. The side-looking radar system of claim 5, wherein f1 and f2 are spaced apart by approximately 2.5 MHz.

7. The side-looking radar system of claim 5, wherein the center frequency $f_c$ is approximately 24.725 GHz.

8. The side-looking radar system of claim 5, wherein the center frequency $f_c$ is approximately 76.5 GHz.

9. The side-looking radar system of claim 4, wherein the frequency control voltage signal has a frequency of approximately 9.7656 kHz.

10. The side-looking radar system of claim 4, wherein the antenna receiver includes analog circuitry that amplifies, filters, and de-multiplexes the baseband signals.

11. The side-looking radar system of claim 10, wherein the analog circuitry includes sampling means for time de-multiplexing reflected signals received by the antenna.

12. The side-looking radar system of claim 11, wherein the sampling means includes a pre-amplifier coupled to two analog signal switches, two low pass filter capacitors coupled to the analog switches, and two output amplifiers coupled to the low pass filter capacitors.

13. The side-looking radar system of claim 12, wherein the analog switches are controlled by two paired switch timing control signals.

14. The side-looking radar system of claim 13, wherein the paired switch timing control signals are time-synchronized to the frequency control voltage signal.

15. The side-looking radar system of claim 14, wherein the analog switches time de-multiplex the down-converted reflected signals into baseband signals for further processing by the processor block.

16. The side-looking radar system of claim 2, wherein the antenna comprises a patch array antenna oriented into a diamond-shape configuration to effectively create a natural linear amplitude taper that aids in rejecting clutter caused by wet road surfaces.

17. The side-looking radar system of claim 16, wherein the antenna comprises a square patch array antenna having N by N patch elements.

18. The side-looking radar system of claim 17, wherein the antenna comprises a 6 by 6 patch array antenna.

19. The side-looking radar system of claim 18, wherein the antenna comprises a 16 by 16 patch array antenna.

20. The side-looking radar system of claim 1, wherein the processor block includes:

(a) an analog-to-digital (A/D) converter coupled to the radar transceiver, wherein the A/D converter converts the reflected signals received by the radar transceiver into a digital data stream;

(b) a processor module application specific integrated circuit (PM ASIC), coupled to the A/D converter and the radar transceiver, wherein the PM ASIC provides timing information to the transceiver, and wherein the PM ASIC conditions the digital data stream to produce sample point blocks;

(c) a random access memory (RAM), coupled to the PM ASIC, for storing the sample point blocks received from the PM ASIC; and (d) a digital signal processor (DSP), coupled to the PM ASIC and the RAM, for performing digital signal processing operations on the sample point blocks stored in the RAM.

21. The side-looking radar system of claim 20, wherein the A/D converter comprises an 18-bit stereo A/D converter integrated circuit.

22. The side-looking radar system of claim 20, wherein the PM ASIC modulates the transmitted radar signals such that they are transmitted at two frequencies, f1 and f2.

23. The side-looking radar system of claim 22, wherein the PM ASIC conditions the digital data stream by associating a first sample point block with the transmit radar signal frequency f1, and wherein the PM ASIC associates a second sample point block with the transmit radar signal frequency f2.

24. The side-looking radar system of claim 23, wherein the PM ASIC stores the first sample point block in a first circular buffer in the RAM, and wherein the PM ASIC stores the second sample point block in a second circular buffer in the RAM.

25. The side-looking radar system of claim 24, wherein the DSP performs a fast Fourier Transform (FFT) operation on the first and second sample point blocks stored in the RAM thereby converting the sample point data from a time domain into a frequency domain.

26. The side-looking radar system of claim 25, wherein the FFT operation is performed on a 512-sample point block.

27. The side-looking radar system of claim 25, wherein the DSP determines the presence, range and closing rate of the object from the frequency domain data resulting from the FFT operation.

28. The side-looking radar system of claim 1, wherein the first bounded range is approximately 2 feet.

29. The side-looking radar system of claim 1, wherein the second bounded range is approximately 12 feet.

30. The side-looking radar system of claim 1, wherein the indicator provides an audible warning to the operator when the object is within the detection zone.

31. The side-looking radar system of claim 1, wherein the indicator provides a visual warning to the operator when the object is within the detection zone.

32. A side-looking radar system for detecting objects in a blind spot of a host vehicle upon which the side-looking radar system is mounted, including:
(a) a Doppler radar circuit for:
(1) transmitting a modulated radar signal having a first and a second transmit frequency;
(2) receiving a plurality of received reflections of the transmitted radar signal that are reflected from an object proximate the host vehicle, wherein each received reflection has an amount of power associated with and corresponding to a Doppler frequency of the received reflections;
(3) detecting a Doppler frequency shift that has occurred between the transmitted radar signal and the reflected radar signal; and
(4) determining the amount of power at each Doppler frequency of the received reflections; and
(b) a controller, coupled to the Doppler radar circuit, for:
(1) determining whether the object from which the received reflections are reflected is within a predetermined detection zone proximate the host vehicle, wherein the predetermined detection zone has a first bounded range that is greater than a minimum range of the radar system and a second bounded range that is less than a maximum range of the radar system; and
(2) providing a warning to an operator of the host vehicle only if the object is detected within the detection zone, and only if the object remains within the detection zone for a predetermined minimum period of time.

33. The side-looking radar system of claim 32, wherein the controller determines whether the object is within the detection zone by ranging the object and determining whether the object is between a predetermined minimum and a predetermined maximum range from the host vehicle.

34. The side-looking radar system of claim 33, wherein the predetermined minimum range is approximately two feet, and wherein the predetermined maximum range is approximately twelve feet.

35. A method for determining whether an object detected by a side-looking radar system is within a predetermined detection zone in a blind spot of a host vehicle upon which the radar system is mounted, including the steps of:
(a) transmitting a modulated radar signal having a first and a second transmit frequency;
(b) receiving reflections of the transmitted radar signal that are reflected from an object proximate the host vehicle, wherein the object has a range relative to the host vehicle;
(c) determining the range based upon frequency characteristics of the reflected radar signals received in step (b);
(d) determining whether the object is within a predetermined detection zone proximate the host vehicle, wherein the predetermined detection zone has a first bounded range that is greater than a minimum range of the radar system and a second bounded range that is less than a maximum range of the radar system; and
(e) providing a warning to an operator of the host vehicle only if the object is detected within the detection zone, and only if the object remains within the detection zone for a predetermined minimum period of time.

36. The method of claim 35, further including the step of indicating that the object is present only if the object is within the detection zone, and not indicating that the object is present if the object is not within the detection zone.

37. The method of claim 35, wherein the step (d) of determining whether the object is within the detection zone comprises:
(a) determining whether the amount of power present in the reflected signals at a selected frequency exceeds a predetermined threshold power level;
(b) determining whether the object has been detected for longer than a predetermined time period;
(c) determining whether the object is between a predetermined minimum and maximum range from the host vehicle; and
(d) determining whether the object is moving faster than a predetermined minimum closing speed relative the host vehicle.

38. A computer program residing on a computer-readable medium and executable on a general purpose computing device, wherein the program determines whether an object detected by a side-looking radar system is within a predetermined detection zone in a blind spot of a host vehicle upon which the radar system is mounted, comprising:
(a) a first set of instructions for transmitting a modulated radar signal having a first and a second transmit frequency;
(b) a second set of instructions for receiving reflections of the transmitted radar signal that are reflected from an object proximate the host vehicle, wherein the object has a range relative to the host vehicle;
(c) a third set of instructions for determining the range based upon frequency characteristics of the reflected radar signals;
(d) a fourth set of instructions for determining whether the object is within a predetermined detection zone proximate the host vehicle, and whether the object remains within the detection zone for a predetermined minimum period of time, wherein the predetermined detection zone has a first bounded range that is greater than a minimum range of the radar system and a second bounded range that is less than a maximum range of the radar system; and (e) a fifth set of instructions for providing a warning to an operator of the host vehicle only if the object is detected within the detection zone, and only if the object remains within the detection zone for the predetermined minimum period of time.

39. The computer program of claim 38, wherein the program is executed by a general purpose computing device within the radar system.

40. The computer program of claim 39, wherein the program is executed by a field programmable gate array device within the radar system.

* * * * *